United States Patent
Gill et al.

(10) Patent No.: US 8,166,463 B2
(45) Date of Patent: *Apr. 24, 2012

(54) METHOD OF CODE COVERAGE UTILIZING EFFICIENT DYNAMIC MUTATION OF LOGIC (EDML)

(75) Inventors: Binny S. Gill, Auburn, MA (US); Wendy A. Belluomini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1241 days.

This patent is subject to a terminal disclaimer.

(21) Appl. No.: 11/864,322

(22) Filed: Sep. 28, 2007

(65) Prior Publication Data

US 2009/0089771 A1   Apr. 2, 2009

(51) Int. Cl.
*G06F 9/44* (2006.01)

(52) U.S. Cl. ........ 717/130; 717/131; 717/124; 717/126; 717/127

(58) Field of Classification Search .................. 717/130, 717/131, 124, 126, 127
See application file for complete search history.

(56) References Cited

U.S. PATENT DOCUMENTS

| | | | |
|---|---|---|---|
| 5,758,061 A | 5/1998 | Plum | |
| 6,105,111 A | 8/2000 | Hammarlund et al. | |
| 6,212,675 B1 | 4/2001 | Johnston et al. | |
| 6,430,741 B1 * | 8/2002 | Mattson et al. | 717/154 |
| 7,530,057 B2 * | 5/2009 | Babcock | 717/158 |
| 2004/0117556 A1 | 6/2004 | Kadi | |
| 2004/0205298 A1 | 10/2004 | Bearden et al. | |
| 2004/0265552 A1 | 12/2004 | Lutz et al. | |
| 2004/0268050 A1 | 12/2004 | Cai et al. | |
| 2006/0101419 A1 | 5/2006 | Babcock | |

OTHER PUBLICATIONS

Li, J. "Prioritize Code for Testing to Improve Code Coverage of Complex Software", 2005, IEEE, p. 1-10.*

* cited by examiner

*Primary Examiner* — Qamrun Nahar
(74) *Attorney, Agent, or Firm* — Cantor Colburn LLP; Van Nguy

(57) ABSTRACT

A method and computer program product for code coverage utilizing efficient dynamic mutation of logic (EDML) are provided. A source code is read, and instrumentation points are located. Self Modifying Code (SMC) is inserted at the instrumentation points producing instrumented code. Additional functions are inserted in the source code to enable read and/or reset of code coverage statistics. The instrumented code is compiled, and executables are run for a period of time during which zero or more instrumentation points are executed. In response to executing instrumentation points, instructions are executed to record execution of the instrumented code. Instructions of the instrumented code overwrite themselves at certain points so that a next execution of the instrumentation points skips over the instrumented code at the certain points. Code coverage statistics are gathered and recorded. The code coverage statistics are reset to begin another period of time for gathering code coverage statistics.

1 Claim, 3 Drawing Sheets

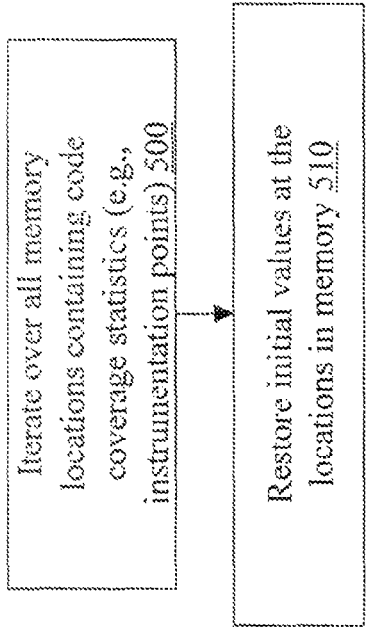
FIG. 3 Instrumentation Points Executed
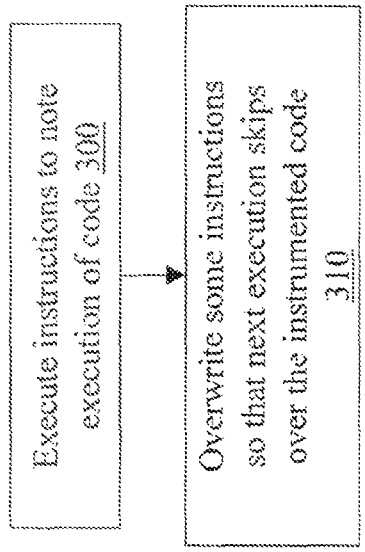
FIG. 5 Code Coverage Statistics Are Reset
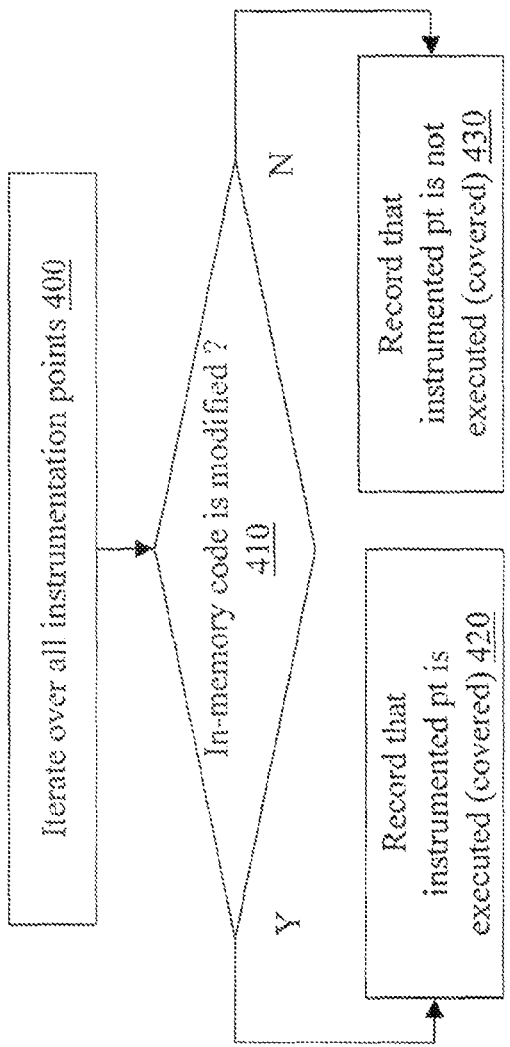
FIG. 4 Code Coverage Is Gathered

METHOD OF CODE COVERAGE UTILIZING EFFICIENT DYNAMIC MUTATION OF LOGIC (EDML)

TRADEMARKS

IBM® is a registered trademark of International Business Machines Corporation, Armonk, N.Y., U.S.A. Other names used herein may be registered trademarks, trademarks or product names of International Business Machines Corporation or other companies.

FIELD OF THE INVENTION

Exemplary embodiments of the invention relate to code coverage, and particularly to code coverage utilizing efficient dynamic mutation of logic (EDML).

BACKGROUND

Code coverage analysis is an important ingredient of good software engineering and was amongst the first techniques invented for systematic software testing. Code coverage measures the degree to which the source code of a program has been tested. After a run of the program, a code coverage tool reports which parts of the code were exercised during the run. This information can be used for determining which portions of the program have not been run. If a product is released with some parts of the code that were never exercised during systems tests, it is highly likely that the program will fail due to software bugs that exist in those untested portions of the program. One of the goals of good software engineering practice is to achieve very high (if not 100%) code coverage during tests to minimize the risk of software failure in the field. It is important to note that achieving 100% code coverage is difficult due to diminishing returns, but the knowledge of code coverage is important to make the proper judgment of the coverage necessary before releasing a product.

Code coverage analysis is an important ingredient of good software engineering and was amongst the first techniques invented for systematic software testing. Code coverage measures the degree to which the source code of a program has been tested. After a run of the program, a code coverage tool reports which parts of the code were exercised during the run. This information can be used for determining which portions of the program have not been run. If a product is released with some parts of the code that were never exercised during systems tests, it is highly likely that the program will fail due to software bugs that exist in those untested portions of the program. One of the goals of good software engineering practice is to achieve very high (if not 100%) code coverage during tests to minimize the risk of software failure in the field. It is important to note that achieving 100% code coverage is difficult due to diminishing returns, but the knowledge of code coverage is important to make the proper judgment of the coverage necessary before releasing a product.

There are many approaches to code coverage measurement. One method is to tap the code segment addresses being requested by the processor. This typically requires hardware modifications but is the most efficient as it does not require changes to the applications. Since hardware changes are much more cumbersome, software methods are mostly favored.

Software methods of code coverage typically take the source code of a program and instrument the source code to introduce extra instructions which will record the execution of different parts of the program. This is typically done at the preprocessing stage before the code is converted into a machine-dependent executable. Hence, this method is highly portable and has been implemented by numerous software vendors like IBM Rational, GNU (gcov), LDRA, etc.

It has been noticed that some complex systems are being developed without leveraging any code coverage tools. One of the most important reasons is the overhead of code coverage tools on execution efficiency. The instrumentation introduced by code coverage tools can slow down the execution of complex software considerably leading to different behavior than what is expected without the instrumentation. This nullifies the relevance of the code coverage analysis. Even when the behavior is the same, the mere fact that the instrumented code takes a longer time to run, is seen as an extra expense (in terms of person and machine hours) that needs to be justified by the potential gains.

Other problems that are routinely faced include the memory, disk, and bandwidth requirements introduced by such instrumentation. In the case of small on-processor caches, the instrumentation may also cause cache pollution lowering the performance via increased cycles-per-instruction. Multi-threaded, multi-processor scenarios only compound the problems further.

It would be beneficial to have dynamic code coverage with lower overhead requirements.

SUMMARY

Exemplary embodiments include a method for code coverage utilizing efficient dynamic mutation of logic (EDML). A source code is read, and instrumentation points are located. Self Modifying Code (SMC) is inserted at the instrumentation points in the source code producing instrumented code. Further code which is not necessarily self-modifying is added to the source code to add functions to read and reset the instrumentation points when the program is running. The instrumented code is then compiled, and executables are run for a period of time during which zero or more of the instrumentation points are executed. In response to executing instrumentation points, instructions are executed to record execution of the instrumented code. Instructions of the instrumented code overwrite certain points of the instrumented code using SMC so that a next execution of the instrumentation points skips over the instrumented code at the certain points and have very low overhead of execution. Code coverage statistics, comprising of which instrumentation points were executed, are gathered using functions included with the program during instrumentation or using external techniques to examine the program memory. After the code coverage statistics are gathered, the code at the instrumentation points can be reset back to the state before the program was executed. This allows for further sessions of code coverage analysis.

Further exemplary embodiments include a computer program product, tangibly embodied on a computer readable medium, for code coverage utilizing efficient dynamic mutation of logic (EDML). The computer program product includes instructions for causing a computer to execute the above summarized method.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 is a flow chart that illustrates when instrumentation points are executed in accordance with exemplary embodiments; and FIG. 4 is a flow chart that illustrates when code coverage is gathered in accordance with exemplary embodiments; and FIG. 5 is a flow chart that illustrates when instrumentation points are reset in accordance with exemplary embodiments.

The detailed description explains exemplary embodiments of the invention, together with advantages and features, by way of example with reference to the drawings.

DETAILED DESCRIPTION OF EXEMPLARY EMBODIMENTS

The benefits of code coverage tools are manifold. Particularly, code coverage helps designers test to uncover the most number of latent bugs in the source code. Another use is to acquire an understanding of the runtime behavior of applications and verify that with respect to the intended design. Code coverage can also be used in the development phase of applications, where developers can use code coverage to determine which portions of newly written source code are being exercised and which logical paths are being taken. This helps reduce the length of the development cycle as well.

Also, code coverage analysis may be used to uncover dead code that is no longer needed (probably belonging to an earlier version). This allows developers to keep the code size minimal leading to easier management and less code clutter.

The most important problem with code coverage tools is the execution overhead of instrumentation. However, exemplary embodiments efficiently (with only a few percentage points execution slowdown) determine which portions of the code are executed at runtime. Exemplary embodiments provide "dynamic" code coverage, such that it is possible to determine which portions of the code execute during any time interval specified by the user at runtime. Dynamic code coverage may be extremely useful for complex systems that run endlessly and have a long startup time.

Further, exemplary embodiments provide the infrastructure necessary to capture and appropriately analyze the code coverage results from multiple runs by multiple developers and testers in a shared environment.

Exemplary embodiments employ Self Modifying Code (SMC) as a way to reduce the high performance overhead of traditional approaches. In accordance with exemplary embodiments. EDML is a highly efficient code coverage analysis method that leverages Self Modifying Code (SMC). EDML is dynamic in that it can be used to collect code coverage information at program runtime for one or more intervals desired by the user.

Figure 1:
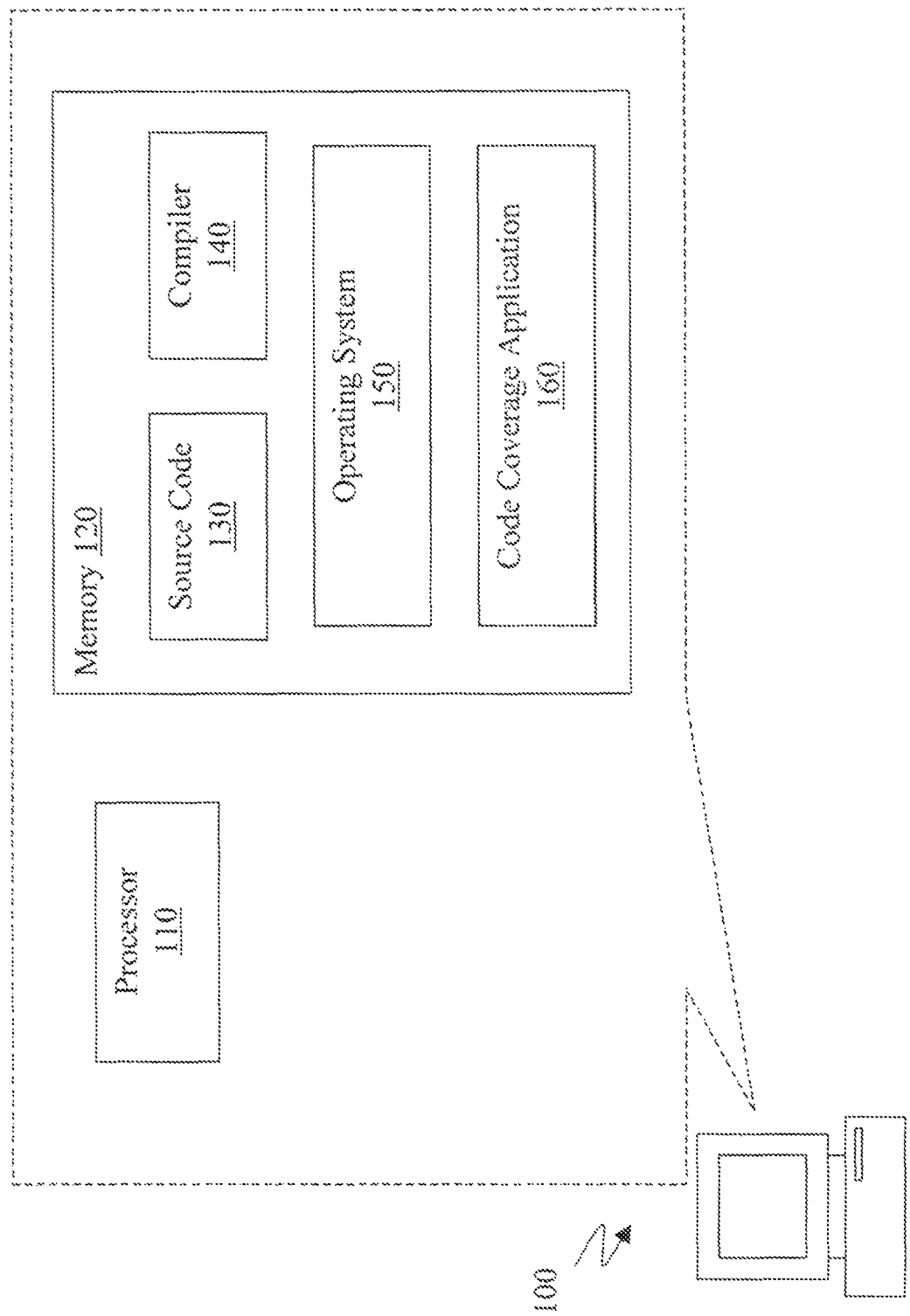
FIG. 1 illustrates an example of a computer in which exemplary embodiments may be implemented.

FIG. 1 illustrates an example of a computer in which exemplary embodiments may be implemented. The computer 100 includes, but is not limited to, PCs, workstations, laptops, PDAs, palm devices, servers, and the like. Generally, in terms of hardware architecture, as shown in FIG. 1, the computer 100 may include a processor 110, memory 120, and one or more input and/or output (I/O) devices (or peripherals) that are communicatively coupled via a local interface (not shown). The memory 120 may include a plurality of caches and other types of storage devices. The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 110 is a hardware device for executing software that call be stored in memory 120. The processor 110 can be virtually any custom made or commercially available processor, a central processing unit (CPU), a data signal processor (DSP), or an auxiliary processor among several processors associated with the computer 100, and the processor 110 may be a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 120 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software in memory 120 may include one or more separate programs, each of which comprises an ordered listing of executable instructions for implementing logical functions. In the example illustrated in FIG. 1, the software in the memory 120 includes a suitable operating system (O/S) 150, compiler 140, source code 130, and the code coverage application 160 of the exemplary embodiments. As illustrated, the code coverage application 160 comprises numerous functional components for implementing the features and operations of the exemplary embodiments.

A non-exhaustive list of examples of suitable commercially available operating systems 150 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company. Sun Microsystems, Inc., and AT&T Corporation; (d) a Linux operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 150 essentially controls the execution of other computer programs, and provides scheduling, input-output control, file and data management, memory management, and communication control and related services. It is contemplated by the inventors that the code coverage application 160 for implementing code coverage according to exemplary embodiments is applicable on all other commercially available operating systems.

The code coverage application 160 may be a source program, executable program (object code), script, or any other entity comprising a set of instructions to be performed. When a source program, then the program is usually translated via a compiler (such as the compiler 140), assembler, interpreter, or the like, which may or may not be included within the memory 120, so as to operate properly in connection with the O/S 150. Furthermore, code coverage application 160 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices may include input devices such as, for example but not limited to, a mouse, keyboard, scanner, microphone, etc. Furthermore, the I/O devices may also include output devices, for example but not limited to, a printer, display, etc. Finally, the I/O devices may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc.

If the computer 100 is a PC, workstation, intelligent device or the like, the software in the memory 120 may further include a basic input output system (BIOS) (omitted for simplicity). The BIOS is a set of essential software routines that initialize and test hardware at startup, start the O/S 150, and support the transfer of data among the hardware devices. The BIOS is stored in some type of read-only-memory, such as ROM, PROM, EPROM, EEPROM or the like, so that the BIOS can be executed when the computer 100 is activated.

When the computer 100 is in operation, the processor 110 is configured to execute software stored within the memory 120, to communicate data to and from the memory 120, and to generally control operations of the computer 100 pursuant to the software. The code coverage application 160 and the O/S 150 are read, in whole or in part, by the processor 110, perhaps buffered within the processor 110, and then executed.

When the code coverage application 160 is implemented in software, as is shown in FIG. 1, it should be noted that the code coverage application 160 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The code coverage application 160 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the code coverage application 160 is implemented in hardware, the code coverage application 160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, a technique of "self-modifying code" (SMC) is used, which may be referred to as the efficient dynamic mutation of logic (EDML). Similar to most code coverage tools, the exemplary embodiments instrument the source code with some code that records the execution of different parts of the code. However, in accordance with exemplary embodiments, the instrumentation that is used to record the execution of the code is also capable of modifying itself in-memory to avoid the overhead of re-recording the execution of the same code in the future. In exemplary embodiments, this dramatically reduces the overhead of code coverage because the bookkeeping is done just once for every instrumented location of the code that was executed.

Below is a non-limiting example of a partial disassembly of machine code that has been instrumented by EDML in accordance with exemplary embodiments. Each instruction is shown in bold and italics with the address within the code segment on the left hand side of the line. Note that "generation" is a global variable that will mostly be found in a register or the L1 cache in the processor since it is used so often. The _blockArray is an array where the code coverage information is recorded. This will not fit in the L1 cache for large programs (like shark microcode) and thus causes cache pollution by making other instructions wait for main memory accesses which otherwise Would have been in the on-processor caches. The non-limiting example of a partial disassembly of machine code that has been instrumented by EDML follows:

```
// To begin with the value in generation variable is set to 1 in the
    program.
8048592:        cmp $0x00000000, generation
    // compares 0 and generation
8048598:        jle 80485ab
    // jumps over the code coverage instructions if generation <= 0
804859a:        mov $0x8048594, %eax
    // moves the address where the constant $0x00000000 is written in
    // the code (two lines above) to the register eax
804859f:        mov generation, (%eax)
    // moves the current value of generation into the address pointed to
```

```
       by register eax
    // This converts the line at 8048592 to be as follows:
    //      8048592:    cmp $0x00000001, generation
    //          This avoids any future execution of this code, unless of
    //          course when generation itself is incremented.
80485a1:        movl $0x1, _blockArray + 12
    // This moves a value of 1 into the corresponding location in the
    // block array that records the execution of this particular block.
    // The "+12" implies the code belongs to the 3rd block in the code.
    // We are using a 4-byte integer to store the bit for each block
       to avoid any locking concerns.
    //    Note that this section where we record the code coverage
    // information can be more complex than just one instruction
    // (including locking or calling another function which writes to a
       file, etc.
80485ab:
```

Note that the non-limiting example above instruments the code such that it jumps over the code coverage recording code only if the global "generation" value is less than or equal to a constant (dynamically overwritten) value in accordance with exemplary embodiments. The constant value is overwritten with the current global generation value every time the code is mutated. Incrementing the global generation value makes all sites of instrumentation active such that the sites of instrumentation will record their execution again the next time the sites of instrumentation are executed. When sites of instrumentation are executed, the condition for the jump is changed such that no more recording takes place until the global value changes again.

In exemplary embodiments, the records of execution of the various instrumentation sites and global generation value are stored in a shared memory, which is accessible by applications external to the program being tested. The records of execution of the various instrumentation sites and global generation value can also be maintained in a private memory area if the program being instrumented can provide a mechanism for external processes to read out the results at runtime and change the global generation value as well.

Multi-threaded and multi-processor applications are also supported as the records are made in different words thus not requiring any locks. All that is needed is the ability to flush the data caches of all processors before reading out the results.

Another feature is that when the process modifies in-memory code, it may be desirable to flush the code from the various processor caches if needed once in a while. Note that this may only be required when the global generation value is changed. At other times, it should be done only if performance suffers otherwise.

There may be different variants of the EDML code coverage process. For example, a simpler variant may be to forgo the dynamic nature of EDMI, and only get code coverage data starting from the beginning of the execution of the program (EDML can provide code coverage in any period specified during the runtime). This can lead to even simpler instrumented code with no need for any global generation value comparison of the instrumented code.

In exemplary embodiments, another variant may be to avoid using the global variable "generation," and instead have within the program a function that can be invoked with a list of target code segments that need to be modified. This function can then overwrite the 'jmp' instructions with 'nop's that will activate the code coverage at the targeted code segments. Once the code coverage code executes, it overwrites the 'nop' back with a 'jmp' instruction that will bypass the coverage logic in the subsequent runs.

In exemplary embodiments, another variant may be to avoid using the _blockArray to store whether instrumentation points are executed or not. Instead, the fact that the code in the instrumentation point has changed from the compiled version is an indication that it has been executed. Therefore, if the code at all the instrumentation points can be read from memory at runtime, the code coverage can be determined based on the state of the code at the instrumentation points. Further, the code at the instrumentation points can be reset to the original compiled version by overwriting the in-memory executable code at the instrumentation points. This provides the same capability that the "generation" global variable provides. As a non-limiting example, on an INTEL processor, the entire SMC at the instrumentation point can simply be one instruction that overwrites itself with a NOP (no operation) or a jump to the next instruction once it is executed.

In accordance with exemplary embodiments, the concepts disclosed that underlie code coverage using EDML can be leveraged for any type of efficient dynamic behavior modification of the program. For example, the exemplary embodiment can be leveraged to provide dynamic error injection or even dynamic delay injection (useful to find timing bugs). The exemplary embodiments can also be used to do more data gathering than code coverage. Indeed, the possibilities are large and thus provide a framework that can programmed by other developers to suit their needs.

Figure 2:
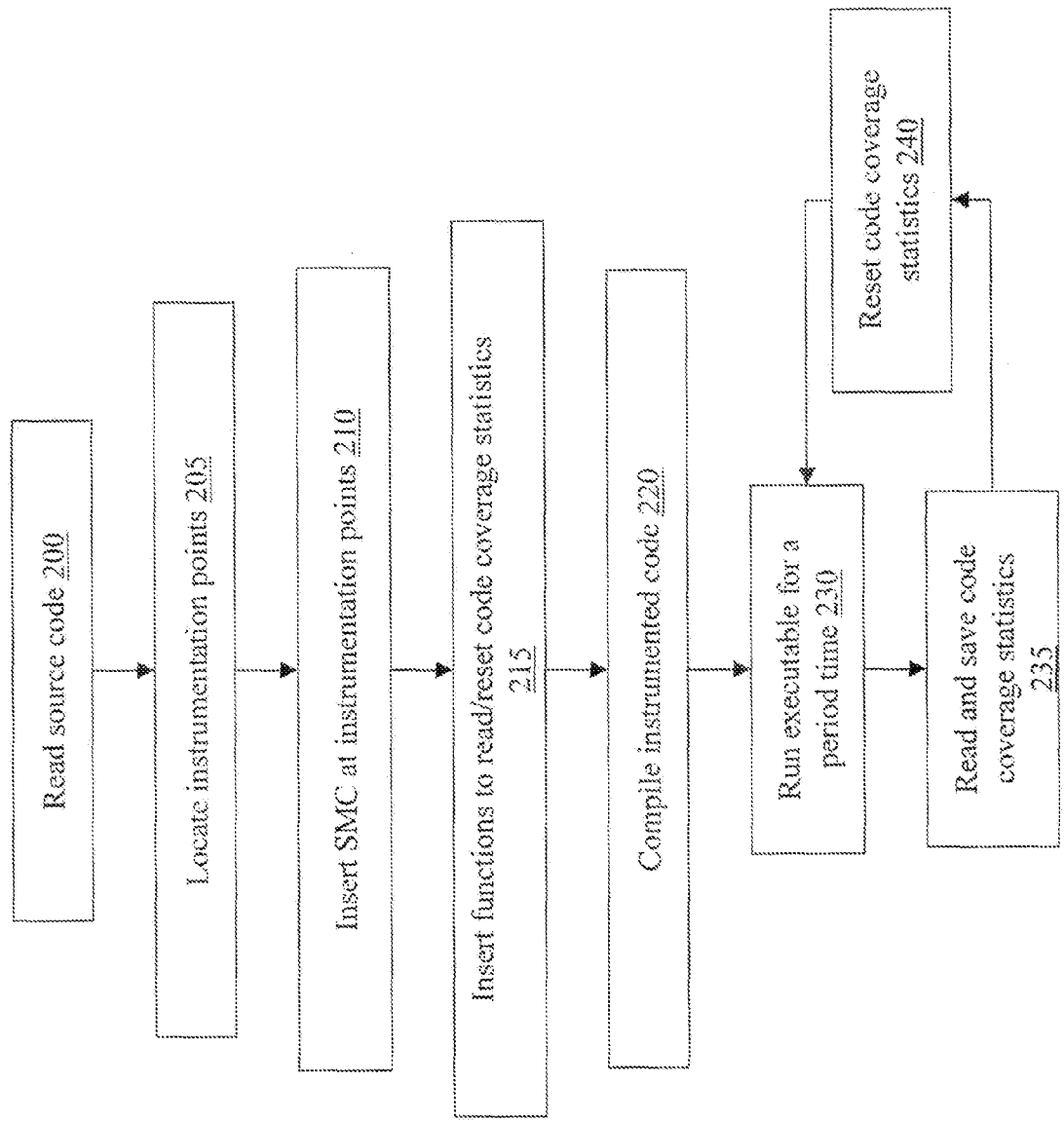
FIG. 2 is a flow chart that illustrates a generalized view of code coverage using EDML in accordance with exemplary embodiments.

FIG. 2 is a flow chart that illustrates a generalized view of code coverage using EDML in accordance with exemplary embodiments. In accordance with exemplary embodiments of the process, the source code is read at 200, and instrumentation points are located at 205. An SMC is inserted at each instrumentation point at 210. Additional functions are inserted in the code that enable the user to read and/or reset the code coverage statistics at 215. The instrumented code is compiled at 220 producing an executable. Executables are run for a period of time at 230. Code coverage statistics are gathered at 235, and the code coverage statistics are reset at 240. Additional explanation of operations in the process is provided below.

FIG. 3 is a flow chart that illustrates when instrumentation points are executed in accordance with exemplary embodiments. In accordance with exemplary embodiments, when instrumentation points are executed, the process executes instructions to note execution of the code at 300. The process overwrites some instructions so that the next execution skips over the instrumented code at 310.

FIG. 4 is a flow chart that illustrates when code coverage is gathered in accordance with exemplary embodiments. In accordance with exemplary embodiments, when the code coverage is gathered, the process iterates over all instrumentation points at 400. It is determined whether in-memory code is modified at 410. If the answer is affirmative to operation 410, this implies that the instrumented point was executed (or in other words, covered) at 420. If the answer is negative to operation 410, this implies that the instrumented point was not executed (covered) at 430. These observations are recorded accordingly at 420 and 430 to be later displayed to the user in any appropriate format.

FIG. 5 is a flow chart that illustrates when code coverage statistics are reset in accordance with exemplary embodiments. In accordance with exemplary embodiments, when code coverage statistics are reset, the process iterates over all locations in memory that contain code coverage data at 500 and restores the initial value at 510. In the embodiment where the code coverage information is obtained from the state of the SMC at the insertion points, the in-memory code at the insertion points is examined, and if changed from the original compiled version, the insertion points are restored to the original values at 510.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for code coverage utilizing efficient dynamic mutation of logic (EDML), the method comprising:
    reading a source code;
    locating instrumentation points;
    inserting self modifying code (SMC) at the instrumentation points producing instrumented code;
    inserting additional functions in the source code to enable reading and resetting of code coverage statistics;
    compiling the instrumented code;
    running executables for a period of time during which zero or more instrumentation points are executed;
    executing instructions to record execution of the instrumented code, in response to executing instrumentation points,
    wherein the instrumented code overwrites themselves at certain points so that a next execution of the instrumentation points skips over the instrumented code at the certain points so as not to record execution, in which skipping over the instrumented code at the certain points is based on a global generation value being less than or equal to a constant value where the constant value is dynamically overwritten with a current global generation value every time the instrumented code is mutated; and
    wherein incrementing the global generation value causes all sites of the instrumentation points to become active for recording execution, and when the all sites of the instrumentation points are executed no more recording execution occurs until the global generation value changes again;
    gathering code coverage statistics;
    resetting the code coverage statistics in memory back to an original state before the executable was run;
    iterating over all instrumentation points when the code coverage statistics are gathered; and
    determining whether in-memory code is modified,
    wherein if in-memory code is determined to be modified, the instrumentation points are reached, and
    wherein if in-memory code is determined not to be modified the instrumentation points are not reached.

* * * * *